(12) United States Patent
Butler

(10) Patent No.: US 7,412,468 B2
(45) Date of Patent: *Aug. 12, 2008

(54) GENERATION OF CRYPTOGRAPHICALLY STRONG RANDOM NUMBERS USING MISRS

(75) Inventor: Richard M. Butler, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 101 days.

This patent is subject to a terminal disclaimer.

(21) Appl. No.: 10/686,331

(22) Filed: Oct. 14, 2003

(65) Prior Publication Data

US 2004/0078402 A1 Apr. 22, 2004

Related U.S. Application Data

(63) Continuation of application No. 09/699,884, filed on Oct. 30, 2000, now Pat. No. 6,678,707.

(51) Int. Cl.
*G06F 1/02* (2006.01)

(52) U.S. Cl. ..................................... 708/250

(58) Field of Classification Search ......... 708/250–256; 710/52–53
See application file for complete search history.

(56) References Cited

U.S. PATENT DOCUMENTS

| | | | |
|---|---|---|---|
| 5,251,165 A | 10/1993 | James, III | |
| 5,301,156 A | 4/1994 | Talley | |
| 5,369,648 A | 11/1994 | Nelson | |
| 5,412,665 A | 5/1995 | Gruodis et al. | |
| 5,416,783 A * | 5/1995 | Broseghini et al. | 708/250 |
| 5,428,561 A * | 6/1995 | Bryant et al. | 708/250 |
| 5,566,099 A | 10/1996 | Shimada | |
| 5,612,963 A | 3/1997 | Koenemann et al. | |
| 5,642,362 A * | 6/1997 | Savir | 708/254 |
| 5,757,923 A * | 5/1998 | Koopman, Jr. | 708/250 |
| 5,778,069 A | 7/1998 | Thomlinson et al. | |
| 5,867,409 A | 2/1999 | Nozuyama | |
| 5,983,380 A | 11/1999 | Motika et al. | |
| 5,987,483 A | 11/1999 | Edelkind et al. | |
| 6,014,446 A | 1/2000 | Finkelstein | |
| 6,192,385 B1 | 2/2001 | Shimada | |
| 6,272,168 B1 * | 8/2001 | Lomp et al. | 708/252 |
| 6,502,116 B1 | 12/2002 | Kelly et al. | |

(Continued)

OTHER PUBLICATIONS

"Analysis and Proposal of Signature Circuits for LSI Testing" by Kasuhiko Iwasaki, IEEE Transactions on Computer-Aided Design, vol. 7, No. 1, Jan. 1988, pp. 84-90.

(Continued)

*Primary Examiner*—Chat C Do

(57) ABSTRACT

In one embodiment, values are retrieved from a number of MISRs which are coupled to a number of microprocessor buses, and a random number is generated based on the retrieved values. In another embodiment, a built-in self-test (BIST) local block of a microprocessor is assigned a major address, and each of a number of multiple input shift registers (MISRs) in the BIST local block is assigned a minor address. An instruction to turn on and initialize the MISRs is then issued, and a request to read the MISRs is issued in response to a request for an encryption key. The MISR readings are then XORed with each other, and with historical readings, if any, to generate an encryption key.

19 Claims, 4 Drawing Sheets

U.S. PATENT DOCUMENTS

| | | |
|---|---|---|
| 6,510,228 B2 | 1/2003 | Rose |
| 6,678,707 B1 * | 1/2004 | Butler ........................ 708/250 |
| 2002/0051542 A1 * | 5/2002 | Kim |

OTHER PUBLICATIONS

Richard M. Butler, "Generation of Cryptographically Strong Random Numbers Using MISRS", Filing Date: Oct. 30, 2000, U.S. Appl. No. 09/699,884 (19 pages of specification, claims and abstract, and 4 sheets of drawings, Figs. 1-10).

Brauch, et al., "Design of Cache Test Hardware on the HP PA8500", IEEE Design & Test of Compters, Jul.-Sep. 1998, pp. 58-63.

Steininger, "Testing and built-in self-test—A survey", Journal of Systems Architecture 46, 2000, pp. 721-747.

* cited by examiner

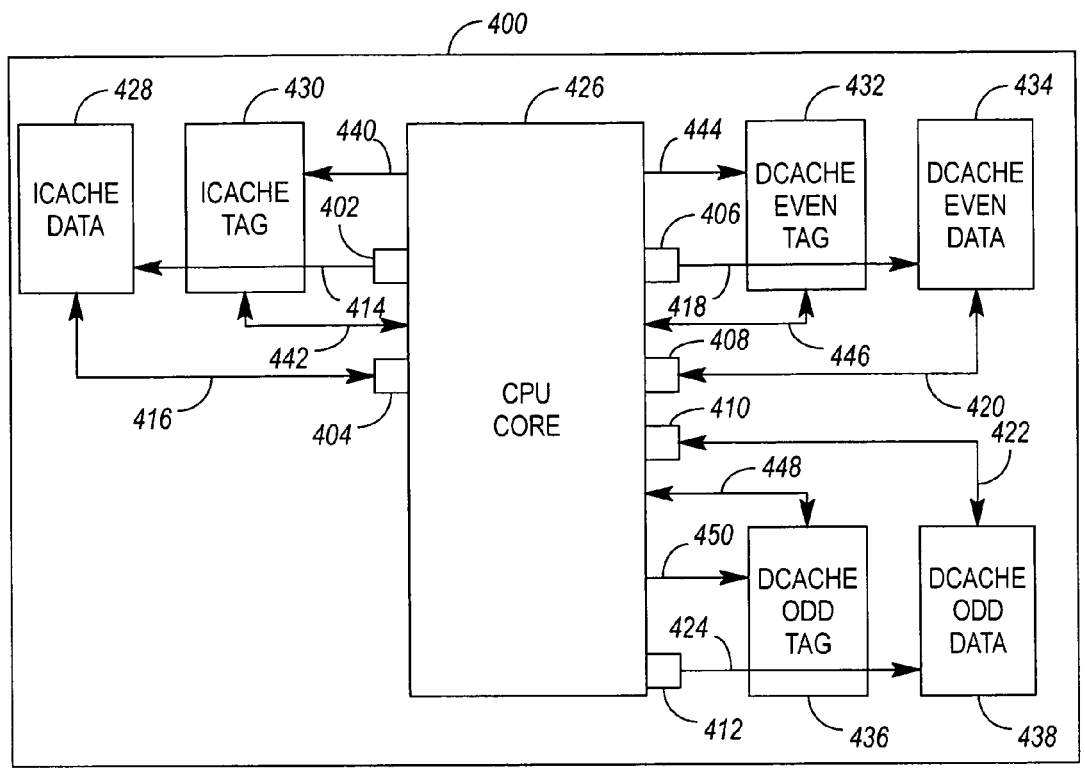
FIG. 4
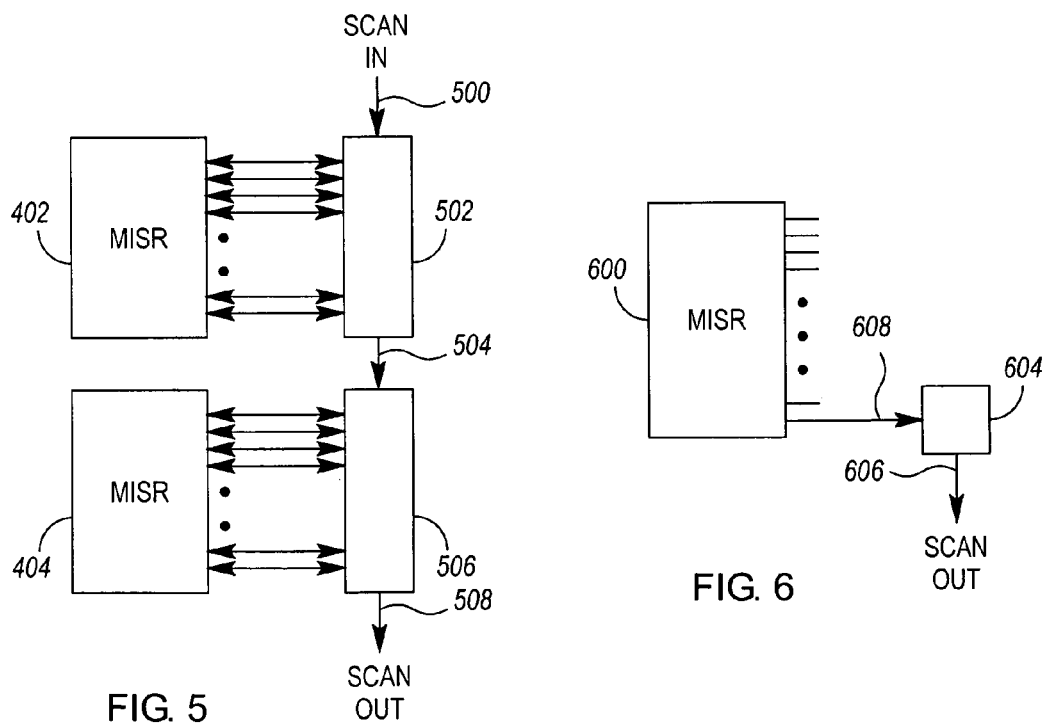
FIG. 5
FIG. 6

GENERATION OF CRYPTOGRAPHICALLY STRONG RANDOM NUMBERS USING MISRS

CROSS-REFERENCE TO RELATED APPLICATIONS

This is a continuation of application Ser. No. 09/699,884 filed on Oct. 30, 2000, now U.S. Pat. No. 6,678,707, which is hereby incorporated by reference herein.

BACKGROUND

Much of today's computer based cryptography requires cryptographically strong random and/or pseudo-random number input (collectively referred to herein as random number input). The cryptographically strong random number input serves as a basis for the generation of cryptographically strong encryption keys. In some systems, a random number will form an encryption key "as is" (i.e., the random number will be used as an encryption key without modification). In other systems, a random number will be used to "seed" an encryption key generation process.

A common form of cryptography which often requires a random number input is public key cryptography. In a form of public key cryptography referred to as RSA (the Rivest, Shamir, and Adelman approach), three elements are required—a public encryption key, a private encryption key, and a modulus. The public encryption key is simply an arbitrary constant, which is usually recommended to be 3 or 65,537. The private encryption key is computed as a mathematical function of two randomly generated large prime numbers (i.e., two random number inputs) and the public encryption key. The modulus is merely the product of the two large prime numbers. To insure that a user can both send and receive encrypted data, the public encryption key and the modulus are publicly distributed over a network. The private encryption key is not distributed over the network, and is preserved in secrecy by its owner.

To send and receive encrypted data over a network, RSA public key cryptography requires the generation of public and private encryption keys for each user desiring to send and/or receive encrypted data over the network. When User A wants to send encrypted data to User B, User A encrypts their data using User B's public encryption key and modulus. Upon receiving User A's data, User B can decrypt User A's data using their private encryption key and modulus. In other words, User B uses User B's own private encryption key and modulus to decrypt data which User A encrypts using User B's public encryption key and modulus. The success of RSA public key cryptography is based on three principles: 1) if the randomly generated large prime numbers are truly large and truly random, it is extremely difficult for an attacker to factor the user's publicly distributed modulus, and as a result, it is extremely difficult for an attacker to determine the identity of the two prime numbers—a message sent to a specific user can only be decrypted if the two prime numbers factored into the specific user's modulus are known; 2) knowing the algorithm which is used to generate a user's modulus (i.e. multiplication) does not assist an attacker in factoring the user's modulus; and 3) users' private encryption keys can really be kept private since there is no need to transfer copies of these keys from one user to another.

The success of RSA public key cryptography therefore depends in part on the generation of two truly random large prime numbers. Many other forms of cryptography also depend on true random number generation. Unfortunately, random numbers are hard to come by in a computer, since by design, computers are very deterministic. If cryptography systems requiring truly random numbers are not provided with truly random numbers, it becomes much more likely that an attacker might be able to decipher encrypted data.

The problem of random number generation is compounded by the fact that many cryptography systems encrypt many different data packets, each of which, or only a small number of which, share the same random number input. Such systems therefore require a high volume of random number inputs, all of which have no relation to one another and are therefore truly random.

In addition to public key cryptography, other situations arise in which cryptographically strong random numbers are needed. For example, one situation is in zero knowledge proofs. A zero knowledge proof is a situation in which one party (a person or computer program) needs to prove to another party that they both share a secret (e.g., a password, access to a social security number, an account number, etc.). If the second party cannot prove to the first party that it already knows the secret, then the first party will not want to disclose and/or discuss the secret with the second party. Random numbers are often required as part of a zero knowledge proof. See, for example, the discussions of zero knowledge proofs found in "Strong Password-Only Authenticated Key Exchange" by David P. Jablon, www.IntegritySciences.com, Mar. 2, 1997; "Zero Knowledge Proofs of Identity" by U. Feige, A. Fiat, and A. Shamir, Proceedings of the $19^{th}$ ACM Symposium on Theory of Computing, pp. 210-217 (1987); and "Strongbox: A System for Self Securing Programs" by J. D. Tygar and B. S. Yee, CMU Computer Science: $25^{th}$ Anniversary Commemorative (1991); and "Multiple non-interactive zero knowledge proofs based on a single random string" by U. Feige, D. Lapidot, and A. Shamir, $31^{st}$ Annual Symposium on Foundations of Computer Science, Vol. 1, pp. 308-317 (October 1990). One method of conducting zero knowledge proofs is via Simple Password-authenticated Exponential Key Exchange (SPEKE). SPEKE is an attractive protocol for authentications conducted between wireless hand-held devices, set top boxes, diskless work stations, smart cards, etc.

Several solutions to the problem of true random number generation have been posed. A first of these solutions is used in versions of PGP, a software-based cryptography application sold by Network Associates of Santa Clara, Calif. PGP keeps a file comprising random numbers which are produced in response to the time intervals between keystrokes which a user makes as they input data into to the PGP program. One disadvantage of this system is that the random number file is kept in a user's file system. The file can therefore be read by a savvy attacker, and/or the values in the file could be forced to values which are supplied by the attacker. In either case, once the attacker knows the values which are queued to be used by the PGP program, it becomes much easier for the attacker to decipher data which is encrypted by the PGP program. Another disadvantage of the PGP program is that only a small amount of random number data is sometimes available since 1) a user is usually not required to input a lot of data into the PGP program, and few keystrokes are therefore made, and 2) depending on the computer and the operating system which the user is using, the time intervals between the user's keystrokes might be quantized to the point where only a few bits of random information are generated in response to each keystroke interval (e.g., four bits of data per keystroke interval). Furthermore, when a user makes numerous keystroke in succession, the speed at which the user makes successive keystrokes will often be quite uniform. An attacker's knowledge of any of the following can therefore be used to zero in on the range of random number data available to the PGP program: a user's typing speed; a user's computer type and speed; and a user's operating system.

Another problem with using user keystrokes for the generation of random number data is that some devices which need to generate random number data might never (or rarely) receive direct user input. For example, consider a server which runs entirely automated computer programs, and which is accessed by an operator via a keyboard only rarely. Or consider a disk which is directly connected to a network (e.g., a Network Attached Storage (NAS) device). In each of these cases, nearly all accesses to the device are initiated over a network (e.g., the Internet), and direct keyboard input to the device is rarely received. Such devices benefit much less from the PGP program's methods of generating random number data.

A second method which has been posed as a solution to the problem of true random number generation involves timing the time it takes to access a disk. A disk access is dependent on the location of the data being accessed, the rotational speed of the disk, and the time it takes to move a disk's heads. All of these factors can vary significantly from one disk access to another, and the time it takes to access a disk is therefore "in theory" a good source of random data. In actuality, however, the amount of random data which can be derived from a single disk access is limited by the resolution with which disk access times can be measured on a given system. Quite often, this resolution is low (e.g., eight bits). Furthermore, a disk access is relatively slow in comparison to the speed at which a computer can execute software which has already been loaded into the computer's cache and RAM memories. Computers on which a lot of files are encrypted therefore suffer performance penalties when they must wait on random number input generated in response to relatively slow disk accesses. A solution to this speed problem is the maintenance of a random number file. This, however, leads to the same data security problem posed by the PGP software program (i.e., since the file is stored in a user's file system, an attacker might be able to access the file, and/or seed the file with known values). Yet another problem with timing disk accesses is that absent a real need to access a disk, encryption software will have to request a disk access for the sole purpose of timing the disk access, and not for the purpose of retrieving substantive data from the disk. Such "dummy" accesses increase the mechanical wear on a disk and introduce system delays which might delay another user's legitimate access to the same disk.

A third method which has been posed as a solution to the problem of true random number generation involves adding to a microprocessor a circuit for amplifying and digitizing the thermal noise produced by the microprocessor. The problem with such a circuit is that it is very hard to verify that it is working properly (i.e., it is hard to test). Since the output of the circuit is intended to be random, the circuit can only be tested by acquiring significant amounts of data from the circuit, and then subjecting the data to complex analysis to determine if the data is in fact random. Another problem stems from the fact that implementing such a circuit as part of a microprocessor's hardware makes it impossible to run two microprocessors in "lock-step". The ability to run two microprocessors in lock-step is an important feature, as it enables one to run the same software program on two microprocessors and compare the state of each microprocessor after execution of each instruction in the software program. If the states of the two microprocessors differ after the execution of an instruction, one can assume that one of the microprocessors is faulty. Since slight manufacturing variances in two supposedly identical microprocessors can alter the thermal noise produced by each, the states of the microprocessor's thermal noise circuits will obviously differ. It is therefore impossible to run microprocessors with thermal noise circuits in lock-step.

Other methods for generating truly random numbers tend to generate data which is progressively more random, but generate the data at a greater cost. For example, one researcher has reported that he connected a digital video camera to his computer and pointed it at three lava lights. He then took all of the bits from the digital image generated by the video camera and put them through a hashing function to generate a string of random bits. While the random numbers generated from this string of random bits might be cryptographically strong, it is not practical for most computer users to implement such a system. Radios and microphones coupled to analog-to-digital converters have also been proposed as sources of random data. However, these devices suffer from the same problems as digital video cameras. They can be expensive, and they do not come standard on all computer systems.

The ultimate source of random data comes from measuring the arrival times of byproducts of radioactive decay. The decay can be background decay (i.e., naturally occurring decay which occurs in the environment around us, but at extremely small levels which require very sensitive detectors to measure) or decay of a radioactive source in a measurement instrument.

Due to the shortcomings and disadvantages of the above methods for generating random numbers, a need exists for a truly random number generator which: 1) generates truly random numbers, 2) is testable, 3) is cost-effective, and/or 4) is very difficult for an attacker to seed with known values and/or reset.

SUMMARY

To fulfill some or all of the above needs, the inventor has devised new methods and apparatus for generating cryptographically strong random numbers (e.g., encryption keys). The methods and apparatus obtain random numbers, and/or obtain seed values from which random numbers can be generated, from built-in self-test (BIST) registers. More specifically, the methods and apparatus disclosed herein utilize data maintained by one or more multiple input shift registers (MISRs) as a basis for generating cryptographically strong random numbers.

The MISRs are configured for sampling data which appears on instruction, data and address buses of a microprocessor. Since the data which appears on these buses is dependent upon cache accesses, disk accesses, user input (e.g., keystrokes), network traffic, and other data operations which influence the course of instructions executed, and data consumed, by a microprocessor, the data maintained by such MISRs has a high degree of randomness. The feedback associated with the MISRs causes their data to depend on both recent and historical cache accesses, disk accesses, keystrokes, network traffic, and so on, thus increasing the randomness of their data. Since today's microprocessors perform thousands of operations a second, the random data stored in these MISRs changes at a high rate of speed, and a large quantity of random data is generated.

If the data stored in the afore-mentioned MISRs can only be read by an instruction of the highest privilege (e.g., an instruction which can only be issued by a computer's operating system), then attacks on the MISRs' data are unlikely to be successful. The security of MISR data is further increased if the MISRs only sample buses which run wholly within an integrated circuit package (i.e., buses which do not present themselves at an integrated circuit's output pins, contacts, etc.).

Due to the high degree of randomness and secure storage of the MISRs' data, encryption keys generated therefrom are cryptographically strong.

It is also significant to note that the data stored in the MISRs is essentially updated at the clock speed of the buses to which they are attached, and by the time a computer has booted up, the data stored in the MISRs has already been updated in response to thousands of variables. Random MISR data is therefore available whenever it is needed, and is available much quicker than random data generated in response to a yet unexecuted disk access.

MISRs are especially useful for generating a random number within a device which receives little or no keyboard input (e.g., a server or a NAS device).

Another advantage of generating random numbers in response to MISR data is that the hardware needed to implement and service a MISR is relatively small and cheap. Furthermore, MISRs which sample the instruction, data and address buses of a microprocessor can also be used as components of BIST hardware. As a result, their use for random number generation is essentially provided at no additional cost, and their testability is insured.

These and other important advantages and objectives of the present invention will be further explained in, or will become apparent from, the accompanying description, drawings and claims.

BRIEF DESCRIPTION OF THE DRAWINGS

Illustrative and presently preferred embodiments of the invention are illustrated in the drawings, in which:

FIG. 4 illustrates a preferred embodiment of how multiple input shift registers such as those illustrated in FIG. 3 can be coupled to various buses of a microprocessor;

FIG. 5 illustrates hardware for scanning data out of two of the FIG. 3 MISRs in parallel, and in a non-destructive manner;

FIG. 6 illustrates hardware for serially scanning data out of one of the FIG. 3 MISRs;

DETAILED DESCRIPTION

Figure 1:
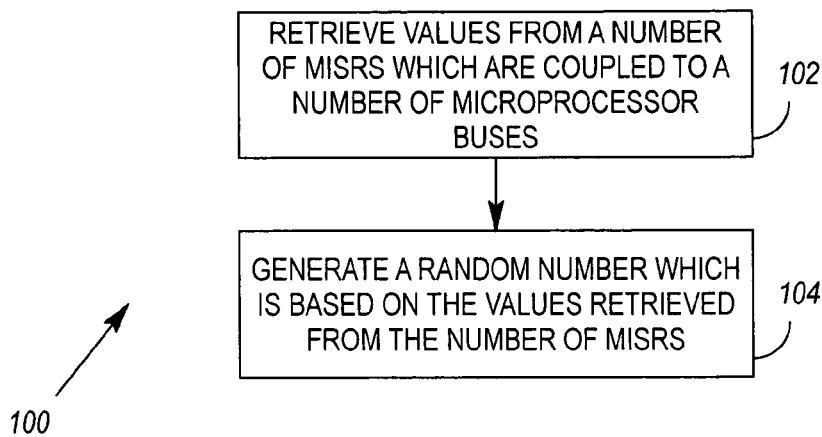
FIG. 1 illustrates a method for generating random numbers.

A method 100 of generating a random number (e.g., an encryption key) is generally illustrated in FIG. 1. The method 100 comprises retrieving values from a number of multiple input shift registers (MISRs) which are coupled to a number of microprocessor buses 102, and then generating a random number which is based on the retrieved values 104.

In order to fully understand the nature of the invention, and the invention's ability to generate truly random numbers, one has to have a basic understanding of how a MISR 300 (FIG. 3) works.

Figure 2:
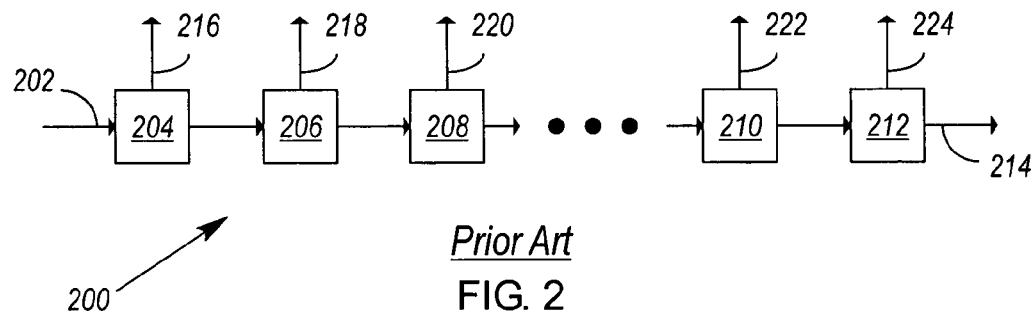
FIG. 2 illustrates a conventional shift register.

A generic shift register 200 is illustrated in FIG. 2. Note that a single external input 202 influences the state of the shift register's most significant bit position 204, and that each remaining bit position 206-212 receives data which is shifted out of a more significant bit position of the shift register 200. A generic shift register 200 may comprise a serial 214 and/or parallel 216-224 output.

Figure 3:
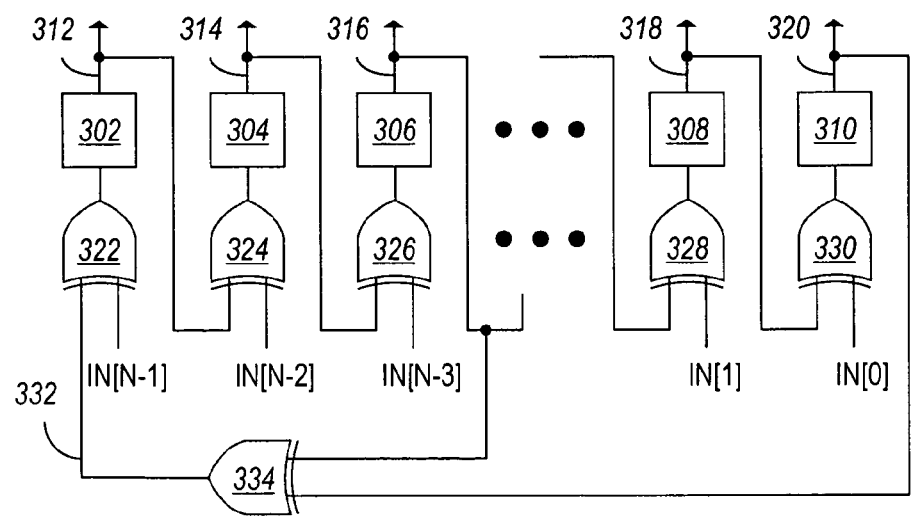
FIG. 3 illustrates a multiple input shift register.

A MISR 300 is illustrated in FIG. 3. A MISR 300 differs from a generic shift register 200 in that an external input IN[X] influences the state of each of its bit positions 302-310 (where X ranges from 0 to N−1, and where N is the number of bit positions 302-310 in the MISR 300). For example, the MISR 300 illustrated in FIG. 3 shows that but for the most significant bit position 302 of the MISR 300, an external input IN[X] is exclusive-ORed (XORed) 324-330 with the output of a bit position X+1 312-318, with the result of the XOR 324-330 being used as the input to the bit position X 314-320. The input for the most significant bit position 312 of the MISR 300 is derived from the XOR 322 of an external input IN[N−1] and a feedback bit 332. The feedback bit 332 is derived from the XOR 334 of a number of bits (e.g., 316, 320) determined by a feedback equation. The feedback equation is preferably chosen to insure that the MISR 300 has a maximal period (i.e., a maximum period between the repetition of a feedback bit sequence if the external inputs IN[X] to the MISR 300 were to remain constant). In some MISR embodiments, feedback is also provided to other bit positions.

In a preferred embodiment of the invention, a number of MISRs 402-412 (FIG. 4) are coupled to various internal buses 414-424 of a microprocessor 400. Take for instance the microprocessor 400 illustrated in FIG. 4, which comprises a CPU core 426 coupled to an instruction cache 428-430 and a data cache 432-438. If each cache 428-430, 432-438 is coupled to the CPU core 426 via an address bus 414, 440, 444, 418, 450, 424 and a data bus 416, 442, 446, 420, 448, 422, the external inputs IN[X] of a single MISR 300 could be coupled to any or each of these buses 414-424, 440-450. Furthermore, the external inputs IN[X] of the same or different MISRs 402-412 could be coupled to each of these buses 414-424, 440-450. A MISR 300 could also be coupled to a bus which presents itself externally to a microprocessor 400. However, if a bus being sampled by a MISR 300 for the purpose of subsequent key generation is externally accessible, it might be possible for an attacker to sample this bus in an effort to determine the value or range of values which a resultant encryption key might assume. If the output 312-320 of a MISR 300 coupled to an externally accessible bus is used in generating an encryption key, it is preferable to combine the output 312-320 of the MISR 300 with other data, as will be explained below, to make the key more cryptographically strong.

Figure 7:
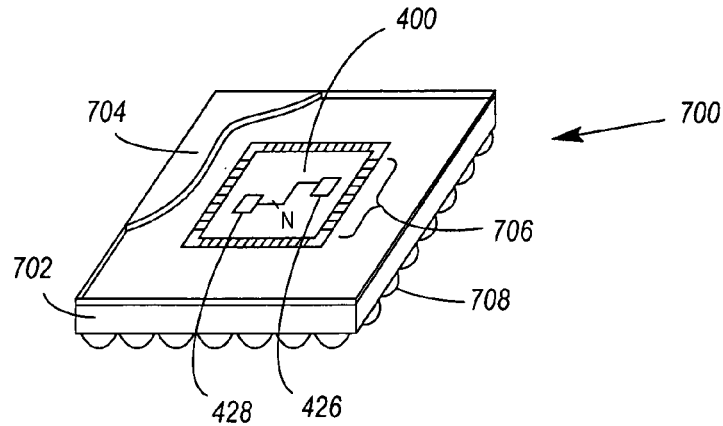
FIG. 7 illustrates an integrated circuit which might house the apparatus illustrated in FIG. 4.

FIG. 7 shows the microprocessor of FIG. 4 mounted within an integrated circuit 700. The integrated circuit 700 comprises a package 702, 704 which serves to house a microprocessor 400 and 1) protect it from damage, and 2) provide larger contacts 708 for connecting the microprocessor to other components. Note that the bus which runs between microprocessor components 426 and 428 runs wholly within the integrated circuit 700, while a bus which uses wires 706 would make contact with solder bumps 708 and run externally from the microprocessor 400.

Regardless of which buses 414-422, 440-450 MISRs 300 are coupled to, and how many MISRs 300 are used, one can appreciate that the output 312-320 of a MISR 300 will depend on every cache access, disk access, keystroke, and other data operation which influences the course of instructions executed by, and data consumed by, a microprocessor 300.

Furthermore, due to the feedback function 316, 320, 334, 332 associated with a MISR 300, the output of a MISR 300 will depend on both recent and historical cache accesses, disk accesses, keystrokes, network traffic, and so on. Since today's microprocessors 300 perform thousands of operations a second, the output of a MISR 300 will change at a high rate of speed, and with great randomness. Even if a MISR 300 is initialized to a predetermined value upon boot of a computer in which it resides, the output 312-320 of the MISR 300 will already have changed dramatically by the time the computer's operating system has been loaded and the computer is ready to receive input from (or generate output for) its user.

In a preferred embodiment of the invention, MISRs 402-412 are coupled to each of the data 416, 420, 422 and address 414, 418, 424 buses connecting a microprocessor's CPU core 426 to the data portions of on-chip instruction 428 and data 434, 438 caches. The MISRs 402-412 are read in parallel by downloading the value of each into temporary registers 502, 506 which are coupled to a serial scan chain 500-508. In this manner, the MISRs 402-412 are read in a non-destructive manner (i.e, the state of each MISR 402-412 is left unchanged after a read of same). While a destructive read of a MISR may also be performed, a destructive read can result in the clearing a MISRs state (or can result in otherwise setting the MISR to a non-random state). Thus, sequential destructive reads of a MISR are less preferred since they can result in the generation of encryption keys which are not very random (or not random at all).

Values stored in each of the temporary registers 502, 506 may be scanned out and utilized by hardware or software to generate one or more encryption keys.

In an alternate arrangement, a single bit of a MISR 600 is coupled to a link 604 in a scan chain 604-608, and the value of the MISR 600 is read in a serial fashion by stepping (e.g., clocking) data out of the MISR 600. An advantage to such a read is that the read leaves the MISR 600 in a new state, which state can immediately be read for the purpose of generating a new and different encryption key or seed value. Another advantage to such a read is that a serially loaded scan chain (where loading refers to the loading of one or more temporary registers 604) requires somewhat less hardware to implement when compared to a parallel loaded scan chain 500-508.

Other means of reading MISRs 402-412 will be known to those skilled in the art, and the above discussion of how data might be read out of a number of MISRs 402-412 is not intended to limit the scope of the invention disclosed herein. For example, data could be read from a number of MISRs 402-412 in a truly parallel fashion. However, it is believed that a truly parallel read system would require substantially more hardware than that required to implement a serial scan chain 500-508, 604-608 (with either a serial 604 or parallel 502, 506 load mechanism as shown in FIGS. 5 & 6). Furthermore, if the MISRs 402-412 used in the instant invention are shared by BIST hardware, a scan chain is likely to already exist, and typically, this scan chain serves no other purpose during normal operation of a microprocessor 400.

Although the state of a MISR 300 which is configured as described herein changes rapidly, a problem with performing closely spaced, successive reads of such a MISR 300 is that the successively read MISR values will be related to some degree. The likelihood that an attacker would be able to determine the identity of all of the related keys upon determining the identity of one of the keys is therefore limited to the strength of the feedback function which is used to feed the most significant bit 302 of the MISR 300. The following post-processing algorithm(s) are therefore proposed.

Figure 8:
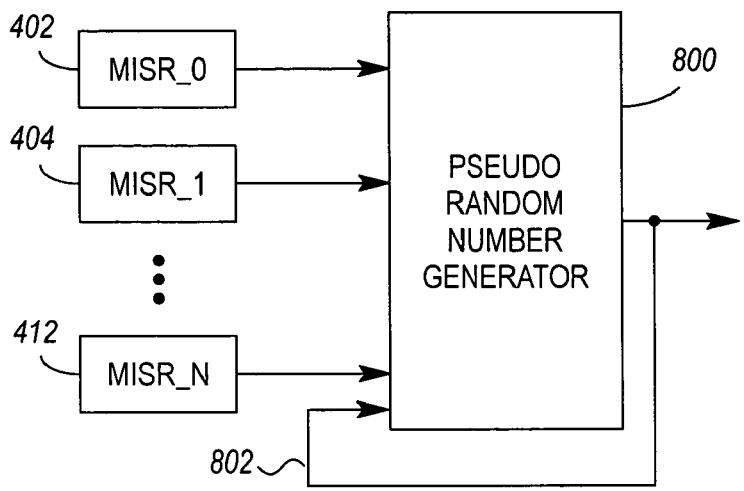
FIG. 8 illustrates a process for combining multiple input shift register outputs to produce random number data.

To deter an attacker's attempts to sample one or more of the buses 414-424 which are sampled by a MISR 402-412, the outputs of more than one MISR 402-412 may be combined utilizing an XOR of corresponding or different bits, a hashing function, or some other means 800. Such a process is illustrated in FIG. 8. Possible dependencies which might exist between two successive (or close in time) reads of a MISR can be eliminated by means 800—especially if the means 800 receives input from not only current MISR reads, but previous MISR reads (i.e., if the means 800 comprises a feedback function 802).

An advantage of generating encryption keys based on the values of MISRs 402-412 connected to various internal microprocessor buses 414-424 is that not only will use of the MISR data generate a cryptographically strong encryption key, but the data also provides a means for testing the function and interaction of internal components of a microprocessor 400 (e.g., the function and interaction of caches 428, 434, 438 and a CPU core 426). Since more and more functionality is being internalized within a microprocessor chip 426, and it is difficult to test the operation of these internal components, a low cost means for testing these components is needed. MISRs 402-412 fulfill this need. Various means of using MISRs to test the functionality of internal microprocessor components (i.e., built-in self test methods) are shown in U.S. Pat. No. 5,301,156 of Talley, and in the article "Analysis and Proposal of Signature Circuits for LSI Testing", K. Iwasaki, IEEE Transactions on Computer-Aided Design, Vol. 7, No. 1, January 1988.

In the above cited patent and journal article, MISRs are used to verify the operation of microprocessors and other components, presumably during testing which is performed prior to a microprocessor's sale to an end user. The MISRs are then disabled during normal operation of the microprocessor. In conformance with the methods of generating a cryptographic key disclosed herein, these same MISRs are turned on during the normal operation of the computer in which the MISRs reside. Turn on is preferably at boot, with each of the MISRs being initialized to a known value. Values may then be retrieved from the MISRs in a number of ways.

One way in which values may be retrieved is via an operating system call. The operating system call can be a call for a read of the MISRs, a call for a value based on the MISR readings, or a call for a cryptographic key. Regardless of the call's form, the MISRs are read in one of the manners previously described. The operating system call can be issued on behalf of an application program (e.g., Netscape® Communicator, PGP Desktop Security, or Microsoft® Internet Explorer) which requests a cryptographic key (or data which can be used to generate a cryptographic key). Alternatively, the operating system call can be issued periodically or otherwise as determined by an operating system. In the latter case, data read from a number of MISRs, or a cryptographic key generated therefrom, may be stored in a temporary register for subsequent use by an application program when the application program needs a cryptographic key. If data read from MISRs is stored on a disk or in RAM, care must be taken to guard the data from attack.

Data stored in a temporary register is preferably stored in a hardware register which is only accessible via operating system calls of the highest privilege level.

An operating system call for a MISR read preferably comprises the operating system's generation of an instruction of the highest privilege level. In this manner, MISRs will be difficult to seed and/or monitor.

While it is possible to provide an application program with direct access to the value(s) from a number of MISRs, such access is not recommended, as the easier it is to obtain data from a number of MISRs, the easier it becomes for an attacker to seed and/or monitor the MISRs.

As has been alluded to previously, MISRs which are used for the purpose of encryption key generation may also be used for BIST functionality. In fact, it is preferred that the MISRs which are used for generating encryption keys form part of a larger network of BIST hardware. If so, the invention depends on little or no "encryption key specific" hardware. Rather, the invention can be embodied in software and/or firmware, and can rely on pre-existing BIST hardware.

The PA8500 microprocessor sold by Hewlett Packard Company of Palo Alto is an example of a processor which already comprises BIST hardware. Specifically, the PA8500 comprises BIST hardware which is designed to write data to (or read data from) internal processor buses such as those which are illustrated in FIG. 4. Through BIST writes and reads, the functionality of the PA8500's internal caches (as well as the PA8500's proper execution of processor dependent code (PDC)) can be tested.

The BIST hardware of the PA8500 is divided into local blocks, with each local block being assigned a "major address". Each register within a local block is assigned a "minor address". In this manner, a particular BIST register may be easily identified and addressed, or data may be easily broadcast to all BIST local blocks. Each local block comprises a MISR, along with a corresponding register for loading data into, or reading data from, the MISR. A hierarchical RDR (remote diagnose register) structure is used to shift data into particular BIST registers.

In the PA8500, MISR operations do not interrupt CPU cache accesses, and therefore operate in a cache-coherent manner. Hence, non-intrusive read and write access to MISR registers is possible. Although not a requirement of the invention, such non-intrusive read and write access is significant, in that it allows encryption keys to be obtained during normal operation of the CPU, and therefore allows encryption keys to be obtained more quickly.

A main BIST control register in the PA8500 provides a means for specifying a major address of a BIST local block which is to be programmed, as well as a means for specifying actions to be implemented (controls) and instructions to be executed within a BIST local block. One control bit in the main BIST control register dictates whether a local block's MISR is enabled or disabled.

Figure 9:
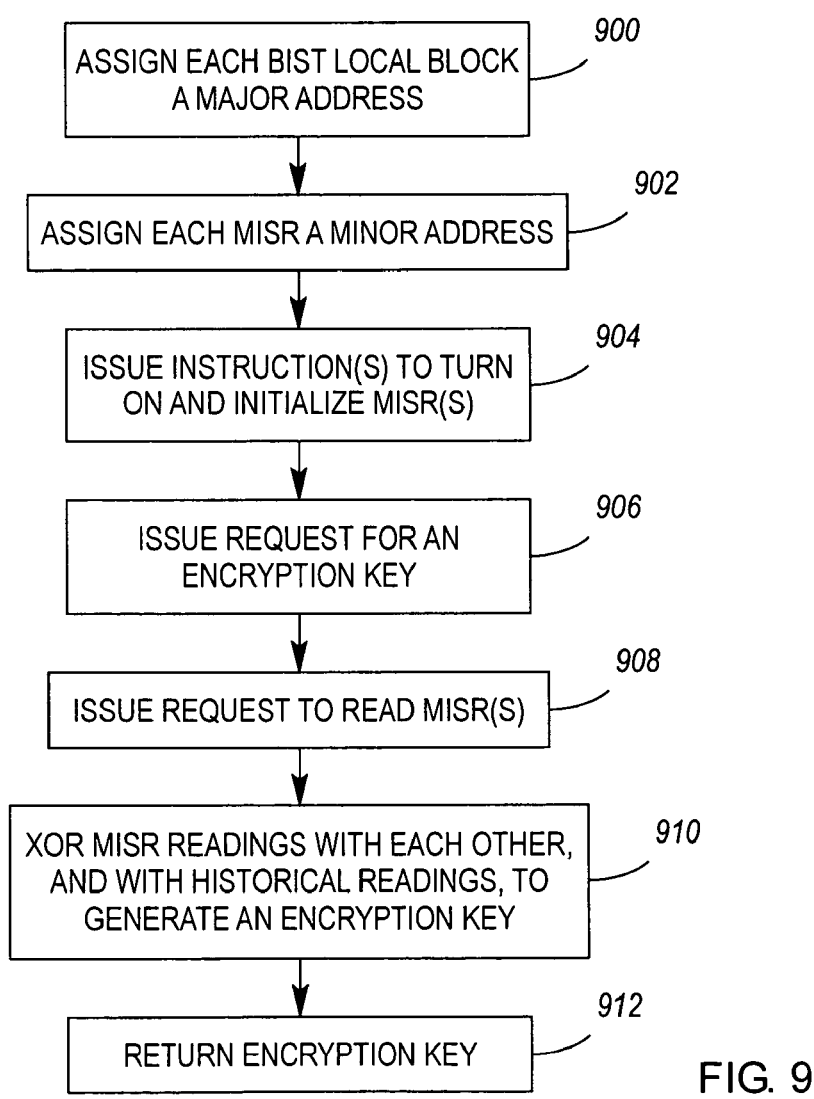
FIG. 9 illustrates a more detailed embodiment of the method illustrated in FIG. 1.

FIG. 9 illustrates a more detailed embodiment of the invention, in which the above described BIST hardware of the PA8500 processor is used for encryption key generation.

In step 900, each BIST local block is assigned a major address. In step 902, each MISR within a BIST local block is assigned a minor address. The MISRs are preferably assigned the same minor address so that broadcast MISR read/write operations are possible. Steps 900 and 902 are preferably performed during chip manufacture.

In step 904, one or more instructions are issued to turn on and initialize the MISRs which will be used for encryption key generation. MISRs may also be subjected to system self-test procedures at this time, thus ensuring their proper functioning. Step 904 is preferably performed upon boot of a computer system.

In step 906, a request is issued for an encryption key. Subsequently, in step 908, a request to read the appropriate MISRs is issued. Thereafter, the MISR readings are XORed with each other (at step 910), and with historical MISR readings, to generate an encryption key. The encryption key is then returned (at step 912) to the application which requested it.

Although the request 906 for an encryption key is shown in FIG. 9 to be prior to the request 908 to read MISRs, the request 908 to read MISRs may, in an alternative embodiment of the invention, be issued first. For example, an operating system might be configured to maintain a queue of encryption keys which can then be provided to an application more quickly than if a MISR has to first be accessed and read. If a queue of encryption keys (or a queue of encryption key seeds) is kept, it is preferable that this queue not be maintained in an easily accessible file (e.g., a user file). In fact, it is preferable to maintain such a queue within a hardware based register file which is only accessible via an operating system call of the highest privilege level.

Figure 10:
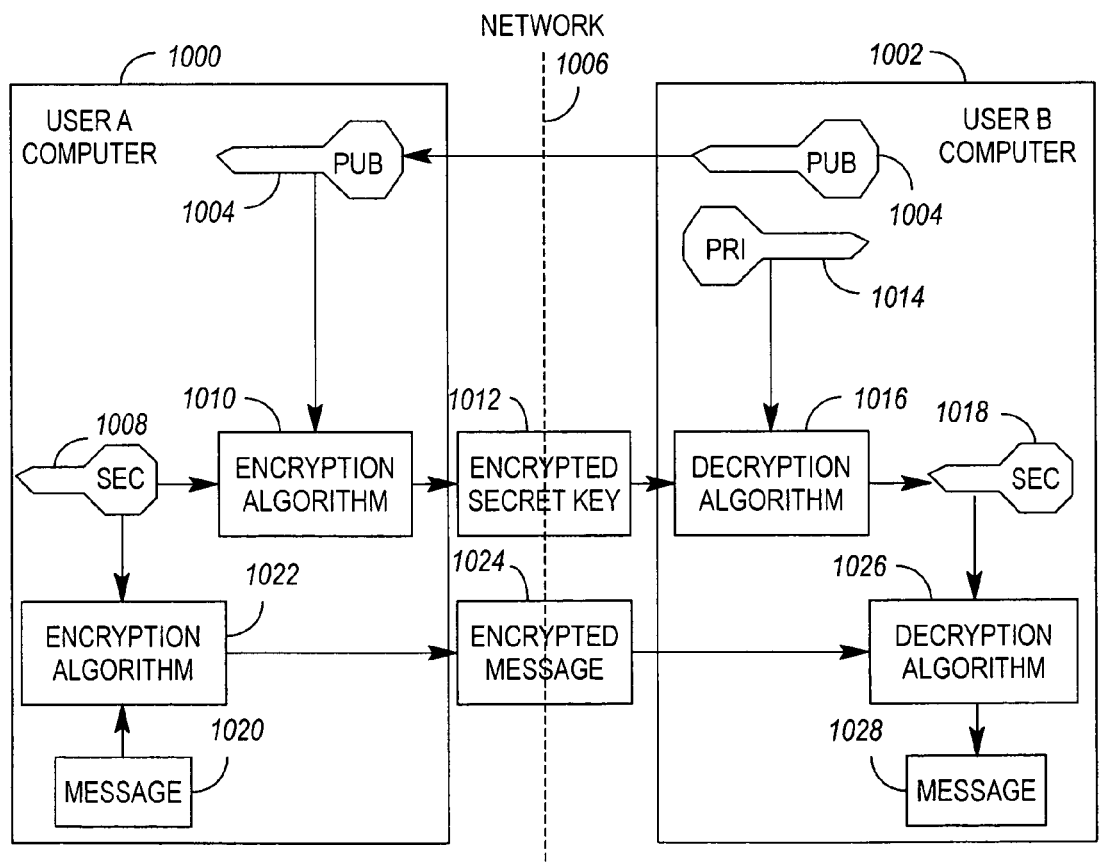
FIG. 10 illustrates an exemplary exchange of encrypted data using a form of public key cryptography.

FIG. 10 illustrates a preferred method of using encryption keys which are generated in accordance with the invention. The preferred method is a variation of the RSA public key encryption method. First, user B obtains an encryption key "seed value" in accordance with the invention. The encryption key seed value is then used to generate a pair of keys: one public key 1004 and one private key 1014. User B then transfers his public key 1004 from his computer 1002 to user's A computer 1000 (preferably over a network 1006 which connects the two computers). Note that the user A and B computers may comprise any combination of personal computers, workstations, servers, devices, server or client applications running on a single or multiple computers, etc.

When user A desires to send a message 1020 to user B, user A obtains their own "secret" random number 1008 and encrypts the message 1020 using a suitable encryption algorithm 1022. User A then encrypts their secret key 1008 using another suitable encryption algorithm 1010 and user B's public key 1004. The encrypted message 1024 and encrypted secret key 1012 are then transmitted to user B's computer 1002 where 1) the secret key 1018 is decrypted using a decryption algorithm 1016 and user B's private key 1014, and 2) the message 1028 is decrypted using a decryption algorithm 1026 and the secret key 1018. Once decoded, user B can read the message 1018.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of generating a random number, comprising:
   sampling data transmitted over a number of microprocessor buses at inputs of a number of multiple input shift registers (MISRs) coupled with the number of microprocessor buses;
   generating values within the MISRs based on the sampled data;
   retrieving the values from the number of MISRs; and
   generating a random number which is based on the values retrieved from the number of MISRs.

2. The method of claim 1, wherein the number of MISRs is one.

3. The method of claim 1, wherein the inputs of one of the number of MISRs are coupled to a data bus which transfers data between a data cache and a CPU core.

4. The method of claim 1, wherein the inputs of one of the number of MISRs are coupled to a bus which runs wholly within an integrated circuit package.

5. The method of claim 1, wherein retrieving values from the number of MISRs comprises:
loading bits of a value stored in a first of the number of MISRs, in parallel, into a temporary register; and
retrieving the value stored in the temporary register.

6. The method of claim 1, wherein retrieving values from the number of MISRs comprises retrieving a value from a first of the number of MISRs by stepping the first of the number of MISRs to serially shift a plurality of bits out of the MISR.

7. The method of claim 1, wherein generating a random number comprises hashing together the values retrieved from the number of MISRs.

8. The method of claim 1, wherein generating a random number comprises XORing the values retrieved from the number of MISRs.

9. The method of claim 1, further comprising, prior to randomly sampling data transmitted over the number of microprocessor buses, turning on and initializing each of the number of MISRs upon boot of a computer in which the MISRs reside.

10. The method of claim 1, wherein value are retrieved from the number of MISRs via an operating system call.

11. The method of claim 10, wherein said operating system call is of a highest privilege level.

12. The method of claim 10, wherein generating a random number is performed immediately after the number of MISR readings are taken, the method further comprising storing the random number in a temporary location for subsequent use.

13. The method of claim 10, wherein said operating system call is issued in response to an application's request for a random number.

14. The method of claim 1, wherein retrieving values from a number of MISRs comprises a computer program's issuance of a request to read the number of MISRs.

15. The method of claim 1, wherein generating said random number comprises providing the values retrieved from the number of MISRs, as well as historic values retrieved from the number of MISRs, to a pseudo-random number generator.

16. The method of claim 1, further comprising testing the number of MISRs by:
initializing the number of MISRs to known values;
executing a test program on the microprocessor in which the number of MISRs reside;
retrieving values from the number of MISRs;
comparing the values retrieved from the number of MISRs with expected values; and
indicating a failure of one of the number of MISRs if its retrieved value does not agree with its expected value.

17. The method of claim 1, further comprising, using the random number as an encryption key.

18. The method of claim 1, wherein the MISRs form part of a microprocessor's built-in self-test hardware.

19. A method of generating an encryption key, comprising:
assigning a built-in self-test (BIST) local block of a microprocessor a major address;
assigning each of a number of multiple input shift registers (MISRs) in the BIST local block a minor address:
issuing an instruction to turn on and initialize the MISRs;
issuing a request to read the MISRs, in response to a request for an encryption key;
XORing the MISR readings with each other, and with historical readings, if any, to generate an encryption key.

* * * * *

UNITED STATES PATENT AND TRADEMARK OFFICE
CERTIFICATE OF CORRECTION

PATENT NO. : 7,412,468 B2 Page 1 of 1
APPLICATION NO. : 10/686331
DATED : August 12, 2008
INVENTOR(S) : Richard M. Butler It is certified that error appears in the above-identified patent and that said Letters Patent is hereby corrected as shown below:

In column 10, line 58, in Claim 1, delete "MISRs." and insert -- MISRs; wherein the inputs of at least one of the number of MISRs are coupled to at least one of a data address bus which transfers data addresses between a data address cache and a CPU core, an instruction data bus which transfers instructions between an instruction data cache and a CPU core, and an instruction address bus which transfers instruction addresses between an instruction address cache and a CPU core. --, therefor.

In column 12, line 27, in Claim 19, after "address" delete ":" and insert -- ; --, therefor.

Signed and Sealed this

Eleventh Day of November, 2008

JON W. DUDAS
*Director of the United States Patent and Trademark Office*